United States Patent [19]

Reyniers et al.

[11] 3,793,026

[45] Feb. 19, 1974

[54] PHOTOCHEMICAL REPRODUCTION PROCESS

[75] Inventors: Albert August Reyniers, Kontich; Hugo Vital Van Goethem, Edegem; Johan Lodewijk Verelst, Kontich, all of Belgium

[73] Assignee: Geavaert-Agfa N.V., Mortsel, Belgium

[22] Filed: Mar. 9, 1971

[21] Appl. No.: 122,546

[30] Foreign Application Priority Data

Mar. 10, 1970 Great Britain .................... 11456/70

[52] U.S. Cl. .......................................... 96/49, 96/33

[51] Int. Cl. .............................................. G03c 1/58

[58] Field of Search ................. 96/92, 115 P, 33, 49

[56] References Cited

UNITED STATES PATENTS

| | | | |
|---|---|---|---|
| 3,222,171 | 12/1965 | Land | 96/92 |
| 3,183,094 | 5/1965 | Cerwonka | 96/92 |
| 3,352,675 | 11/1967 | Cerwonka | 96/115 P |
| 3,244,519 | 4/1966 | Schwerin | 96/92 |
| 3,620,735 | 11/1971 | Ulano | 96/92 |
| 2,409,564 | 10/1946 | Heinecke et al. | 96/83 |

*Primary Examiner*—Norman G. Torchin
*Assistant Examiner*—John L. Goodrow
*Attorney, Agent, or Firm*—William J. Daniel

[57] ABSTRACT

A colored image or pattern formed of one or more colored hydrophilic colloid layers is produced on a permanent support by transferring onto such support in the presence of an aqueous liquid from a temporary support carrying the same, an unhardened colored hydrophilic colloid layer containing a photosensitive iron (III) complex which yields iron (II) ions on exposure to active electromagnetic radiation, exposing the thus transferred colloid layer while in a substantially dry state to an image of such radiation, treating the exposed layer with an activator liquid containing a substance that releases iron (III) ions from the iron (III) complex, and washing away the exposed regions of the colloid layer leaving a relief pattern corresponding to the unexposed portion of such layer, these steps being repeated in sequence for each colored colloid layer transferred to the permanent support to constitute the ultimate colored image or pattern. A suitable activator liquid is an aqueous liquid having a pH above 8 and containing an alkaline compound selected from the group comprising an alkaline metal carbonate, ammonium hydroxide or a water-soluble organic base.

26 Claims, No Drawings

PHOTOCHEMICAL REPRODUCTION PROCESS

The present invention relates to a photomechanical recording and reproduction process for producing positive coloured colloid patterns, and more particularly to a process for producing half-tone and line-work multicolour images.

The production of halftone colour images is of interest in the field of design, e.g., in the production of colour decorative patterns, colour wiring and circuit diagrams, cartography, colour proofing and in the production of transparencies for dia- or overhead-projection.

Especially in the colour field of the graphic art there is a great need for a simple and fast technique offering "colour proofs" of high quality and reproducibility.

Colour proofing materials serve to produce a showing proof for submission to the printer and its client to give an idea of a multicolour halftone reproduction as will be produced by the successive printing in register with the separate standard inks: yellow, magenta, cyan, and black.

The colour proof makes is possible to determine which corrections, if necessary, have to be made to the separation halftone transparencies that are used in the exposure of the photosensitive coatings selected for forming the final printing form.

Colour proofing systems may be classified into two groups, one group wherein the multicolour proof is prepared starting from halftone separation negatives and the other group wherein the multicolour proof is prepared starting from halftone separation positives. Therefore the first system is called negative colour proofing system and the second positive colour-proofing system.

It is one of the objects of the present invention to provide a recording and reproduction process suited for the production of coloured colloid patterns having the same image values as the original applied in the exposure.

It is more particularly an object of the present invention to provide a recording and reproduction process that is especially suited for producing high quality positive halftone and line-work multicolour prints in an economic highly reproducible and easy way.

The process of the present invention for the production of (a) colloid pattern(s), wherein (a) hardenable hydrophilic colloid layer(s) is (are) used, which contain(s) a photosensitive substance and which layer(s) is (are) hardened in the non-irradiated portions by means of an active species set free after the information-wise exposure to active electromagnetic radiation of the photo-sensitive substance, contains the steps of:

1. transferring a hydrophilic hardenable colloid layer from a temporary support to a permanent support, said colloid layer containing before and/or after the transfer a photosensitive iron(III) complex compound and a hydrophilic colloid which undergoes a reduction in water-solubility by iron(III) ions, said temporary support being relatively hydrophobic in respect of the permanent support, and the transfer of said colloid layer to said permanent support being carried out by pressing the latter support in the presence of an aqueous liquid (in other words in moist or dampened state) against said colloid layer, and removing the temporary support, thus leaving said layer on the permanent support, 2. exposing the transferred colloid layer in substantially dry state to electromagnetic radiation, which is capable to produce iron(II) ions from said iron(III) complex and that is modulated according to the information to be recorded,
3. treating the exposed layer with a substance that liberates iron(III) ions from the iron(III) complex, and
4. developing the exposed layer by a wash-off treatment leaving a coloured relief pattern corresponding with the non-exposed portions of the colloid layer and, when superposed coloured colloid patterns on a single permanent support have to be produced, repeating the steps (1), (2), (3), and (4) with said hydrophilic colloid layers having a colour as desired.

According to said process multicoloured halftone prints can be produced, the halftone dots of which have a size largely independent of the exposure time. This property, the reproducibility of the results and the fact that halftone dots of high quality (of particularly good sharpness) are produced make that process especially suitable for high-quality halftone multicolour work.

The reproducibility of the results obtained by the application of said process is particularly good when the photosensitive ingredient(s) and the dyestuffs on the photosensitive colloid layer are contained already in its coating composition in a properly determined amount before the coating step of this layer.

Although less reproducible results are obtained when the photosensitive ingredient is incorporated by imbibition it is possible to obtain useful results if the photosensitive ingredient, is incorporated by dipping the hardenable colloid layer before its transfer to the permanent support in an aqueous solution containing a suitable photosensitive iron(III) complex compound.

The shelf life of the unexposed colloid layers is very good.

The hardening and the wash-off treatment applied in the present invention are very simple and do not require the use of inflammable and poisonous organic solvents.

According to a preferred embodiment of the present invention the hydrophilic coloured colloid layers contain gelatin and a photosensitive iron(III) complex, which produces iron(II) ions on exposure to active electromagnetic radiation.

The preferred iron(III) complexes, which on exposure to active electromagnetic radiation yield iron(II) ions, are of the type wherein the iron(III) ion is complexed by means of ligands having an electron-donating character with respect of the iron(III) ions. Such iron(III) complexes are preferably derived from a polybasic acid that forms complexes of the formula $(Fe^{3+}A_n^{z})^x$ wherein $z$ represents the valency of the organic acid, and $x$ represents that of the resulting complex ion. According to P. Glafkides in Photographic Chemistry, Vol. I — Fountain Press, London (1958), p. 422, the relation $x = z{\cdot}n-3$ must apply, $n$ being the number of molecules of acid.

Iron(III) complexes that are particularly suited for use according to the present invention are e.g. complex oxalates, of iron(III) ions, preferably iron(III) potassium oxalate and/or iron(III) ammonium oxalate having the formulae $K_3Fe(C_2O_4)_3$ and $(NH_4)_3Fe(C_2O_4)_3$ respectively. The preparation of said compounds is described, e.g., in P. Glafkides — Photographic Chemistry — Fountain Press, London, (1958) Vol. I, p. 430.

Preferably the most water-soluble complexes are used or mixtures of these complexes that do not crystallize at low concentrations. Preferred in this respect is ammonium iron(III) oxalate. The recording layer may contain up to 40 percent by weight of ammonium iron(III) oxalate without giving rise to crystallisation in the colloid. Preferably the hardenable coloured colloid layer contains 10 to 25 percent by weight of the iron(III) complex calculated on the weight of the dry hydrophilic colloid(s) e.g. gelatin.

In principle it is not necessary to use light-sensitive complexes of iron(III) since a number of transition metals of variable valency form complex polybasic acid salts in the same way as iron (see the above-cited P. Glafkides reference, p. 423). The metal ions in the said complexes have to lose a valency by the action of light. Metals, which in this respect resemble iron are, e.g., cobalt, chromium, and manganese. The most light-sensitive complex salts are the oxalates followed by the tartrates. The citrates are the most stable of them. The light-sensitivity of the iron(III) complex salts is in the wavelength range of 360–450 nm.

The hardening of the hydrophilic colloid in the unexposed portions of the recording layer proceeds by means of iron(III) ions set free from the unexposed photosensitive iron(III) complex by means of a liquid, which furtheron is called "activator liquid."

By means of a first type of activator liquid the liberation of iron(III) ions from said complex may proceed by raising the pH above 8, e.g., by means of an aqueous solution of an alkali metal carbonate, ammonium hydroxide or a water-soluble organic base, e.g., an aliphatic, alicyclic or heterocyclic water-soluble amine. Preferred amines are ethanolamine, diethanolamine, triethanolamine, cyclohexylamine, dicyclohexylamine, dimethylenetriamine ($H_2N—CH_2—NH—CH_2—CH_2$), urotropine, and morpholine.

According to a special embodiment the iron(III) ions are set free by treating the information-wise exposed recording layer with ammonia and water vapour as is done in the so-called "dry development" of the diazotype process. Thus, for that purpose a common diazotype apparatus can be used for successively performing the two operations of exposure and development by transporting the original and the photosensitive material in superposed relation, e.g., with the help of an endless belt conveyor, through separate exposure and development compartments.

A second type of activator liquid setting free iron(III) ions from said complex is an aqueous solution containing a metal salt of a fairly weak metal hydroxide and a relatively strong acid, which metal salt on hydrolysis yields an aqueous solution with a pH lower than 7. The anionic part of the salt is preferably an anion derived from an acid yielding in a concentration of 0.1 equivalent per liter a pH of 1, e.g., hydrochloric acid, p-tolusulphonic acid, sulphuric acid and nitric acid. The cationic part of the metal salt is preferably derived from metals such as the alkaline earth metals magnesium, calcium, strontium and barium, and other bivalent metals that do not belong to the group of the transition metals and that yield fairly weak bases such as zinc, cadmium, and lead. Those metal ions are preferred that produce an oxalate having a fairly low solubility product in aqueous medium, e.g. smaller than $10^{-7}$.

Optionally the liquid setting free iron(III) ions contains an organic water-miscible solvent to improve the selective hardening of the non-exposed portions of the hydrophilic colloid recording layer.

The use of an organic water-miscible solvent in the liquid setting free iron(III) ions restrains the swelling of the unexposed portions of the colloid layer in the wash-off step. Organic solvents suited for that purpose are water-miscible alkalnols and ketones e.g. methanol, ethanol, isopropanol and acetone. The same effect can be obtained by the use of electrolytes that are known for precipitating (flocculating) gelatin from its aqueous solution, e.g., ammonium sulphate, sodium sulphate and other electrolytes known for that purpose in combination with the proper hydrophilic colloid. For solvent precipitation and electrolyte precipitation of gelatin reference is made, e.g., to Photographic Emulsion Chemistry by G.F. Duffin, The Focal Press, London and New York (1966), p. 78–80.

Preferably used hardenable colloids for use in the photosensitive layer are hydrophilic water-soluble colloid polymers containing active hydrogen atoms as are present, e.g., in hydroxyl groups and carbonamide groups. Both qualitative characterization and quantitative determination of active hydrogen can be carried out by the procedure known as the Zerewitinoff active hydrogen determination. Hardenable colloids containing active hydrogen atoms, are, e.g., polyvinyl alcohol, polyacrylamide or gelatin, and other film- or stratum-forming proteinaceous colloids.

In the present invention best results are obtained with hydrophilic water-soluble colloids that possess the property of "sol-gel transformation" such as gelatin, which offers an easy transfer and good adherence to the permanent support. "Sol-gel transformation" is explained by R.J. Croome and F.G. Clegg in Photographic Gelatin — The Focal Press — London (1965), pages 37-39.

In the production of superposed multicolour colloid patterns the dyes used in the photosensitive colloid layer have to be resistant to diffusion and chemically inert in the processing and washing liquid(s) as much as possible. When used in "colour proofing" they have to match with the absorption spectrum of the standard process inks as close as possible. Particulars about standard colour inks can be found in H.M. Cartwright — Ilford Graphic Arts Manual (1962) Vol. I — p. 502–504.

There exist "cold" and "warm" colour standards. Cold colour tones are standardized, e.g., in the U.S.A. in the GATF-Color Charts and in the German Standards DIN 16508 and 16509. Warm colour tones are standardized, e.g., in the German Standard DIN 16538.

The "cold" colour standards are characterized by the use of fairly pure magenta pigments, mostly insolubilized Rhodamine and Phloxine dyes, which have a very low side-absorption in the blue region of the spectrum.

The "warm" colour standards are characterized by the use of insolubilized azo dyestuffs. Said dyestuffs are more resistant to solvents, e.g., alcohol, than the Rhodamines and Phloxines, but they possess a much higher side-absorption in the blue region of the spectrum.

It has been found experimentally that pigments that are very poorly soluble or insoluble in water and organic liquids of the alcohol or polyhydric alcohol type, e.g., glycerol, are fulfilling the requirements of resistance to diffusion. Pigment dyes that are applied from an aqueous dispersion are used preferably, though the use of substantive dyes that are chemically linked to a colloid or polymer is not excluded. For colour proofing purposes the hardenable colloid layer contains pigments in a concentration so high that the optical density in the wavelength range of maximum absorption is at least 0.35.

Apart from the use of dyes, the absorption spectrum of which has to satisfy particular requirements for colour proofing, all colours are considered, e.g., cyan, light cyan, magenta, warm magenta, black, yellow, green, brown, orange, red, blue white as well as metallic colours such as pale gold, rich gold, copper, and silver. In other words when using the term "colour" in the present invention it is meant to encompass all pure and mixed colours as well as black-and-white.

Non-migratory pigments suitable for use in the present invention are known by the name "PIGMOSOL" and "COLANYL" dyes. "PIGMOSOL" and "COLANYL" are trade marks of Badische Anilin- & Soda-Fabrik A.G., Ludwigshafen/Rh., W. Germany, for organic pigment dyes, that are mixed with a dispersing agent for aqueous medium. These pigment dyes excel in resistance to light, heat, acids, bases, oxidizing agents, and solvents. They are insoluble in hydrophilic colloids such as gelatin.

The black pigment for the black-toned partimage is preferably carbon black.

Even if the pigments are completely inert in the aqueous processing and washing liquids they may to some extent stain the permanent support at the non-exposed areas as a result of simple adhesion forces. In order to avoid a direct contact of the pigment(s) with the permanent support the pigment coating on the temporary support is over-coated with a hydrophilic colloid layer (top layer), which does not contain pigments or dyes for forming the image. On transfer of such composite coating the top layer comes into contact with the permanent support and is sandwiched between said support and the pigmented coating. The top layer contains the same colloid(s) as the coloured layer and is preferably of the same composition as the pigmented coating except for the presence of the visible image-forming pigment(s) or dyes thereon.

The top layer, however, may contain a small amount of translucent pigments, e.g., silica particles, protruding from the layer and being a few microns thicker than the top layer. They avoid sticking of coiled sheet material at relatively high (e.g., 60 percent) relative humidity. The top layer contains, e.g., 1 to 1.5 g of gelatin per sq.m.

In order to obtain images with a good resolution, relatively thin radiation-sensitive coloured colloid coatings are preferred. Preferably they have a thickness in the range of 1 $\mu$ and 15 $\mu$. Good results are obtained with coloured colloid layers containing 2 to 10 g of gelatin per sq.m. Very good results are obtained with coloured layers having a thickness of 4 to 5 $\mu$ and containing 2.5 to 3 g of geltain per sq.m. The colloid layers preferably contain at least 50 percent by weight of gelatin.

The adhering power of the transferable coating to its temporary support, preferably a flexible one, has to be adjusted in such a way that an easy stripping off from the temporary support is possible after the pigment coating has been pressed into contact with the permanent support. Therefor a relatively hydrophobic temporary support can be used, e.g., a non-subbed cellulose triacetate, polystyrene, polyethylene terephthalate, polyvinyl chloride, polycarbonate ester, copoly(vinyl acetate/vinyl chloride) or cellulose acetobutyrate sheet and a permanent support having a hydrophilic surface, e.g., a polyethylene terephthalate support subbed in a way that gelatin coatings can be applied, e.g., a hydrophobic support subbed as described in the Belgian Pat. Specification No. 721,469. According to a preferred embodiment the photosensitive coating is composed in such a way that its adherence to the temporary support in wet state is less than in dry state. This can be attained by the addition of hygroscopic agents, e.g., a water-soluble organic hygroscopic compound such as glycerol, and the use of wetting agents and plasticizing agents in the hardenable coating. A temporary support having a repelling power for wet gelatin coatings is, e.g., the modified paper base used in the "Bromolith" material (Bromolith is a registered Trade Mark of Gevaert-Agfa N.V. for a light-sensitive paper offset plate). Said paper base is coated with a layer of insolubilized polyvinyl alcohol or a layer of alginic acid insolubilised with an alkaline earth metal salt.

The permanent support may be rigid as well as flexible and only must present by itself or by means of (a) subbing layer(s) a good adherence in wet as well as in dry state for the transferable hydrophilic colloid coating.

Depending on the use of the multicolour print the permanent support is transparent or opaque. So, it is possible to use metal layers or sheets, glass, ceramics, resin supports and paper impermeabilized for the processing and washing liquids. As suitable resin supports are to be mentioned particularly film supports of cellulose triacetate, polyethylene terephthalate, polycarbonate, polystyrene, or polymethacrylate.

For purposes such as colour proofing wherein several exposures have to be effected in register it is necessary to use a resin support with high dimensional stability.

Resin supports characterized by a high mechanical strength and very low water-absorption and consequently high dimensional stability in dry and wet stage can be formed from a linear polyester, e.g., polyethylene terephthalate. Good results as to dimensional stability are obtained with aluminium sheets sandwiched between two high wet-strength paper sheets, although this material is rather expensive.

Permanent resin supports can be made opaque by coating them with a matted subbing layer or by matting or colouring them in the mass. The matting may be effected by pigments known therefor in the art, e.g., titanium dioxide, zinc oxide, and barium sulphate. Matting can also be obtained by producing a "blush-coat" as described, e.g., in Canadian Pat. specification No. 654,438.

Hydrophobic resin supports to be used as permanent support according to the present invention are coated with one or more subbing layers for a hydrophilic colloid layer. The subbed hydrophobic film support may be provided on one side or on both sides with a subbing layer or combination of subbing layers.

The permanent support for use in colour proofing is preferably a polyester resin support being coated with a first subbing layer on the basis of a copolymer containing hydrophobic and hydrophilic structural units in a proper ratio, this first subbing layer being overcoated with a second subbing layer, which is more hydrophilic than the first one and contains gelatin, a hydrophobic latex polymer and a white pigment, e.g., titanium dioxide particles for conferring the support an opaque aspect.

A permanent support particularly preferred for the production of dimensionally stable reproductions as are needed, e.g., in colour proofing is a polyethylene terephthalate support subbed with a system of subbing layers as described in the Belgian Pat. specification No. 721,469. The opaque white support has an opacity and whiteness ressembling as much as possible the whiteness and opacity of the printing stock whereon the actual print has to be made.

In said Belgian patent specification, which with regard to the composition and preparation of the permanent support has to be read in conjunction herewith, a sheet material is claimed that successively comprises a hydrophobic film support, a layer (A) that directly adheres to said hydrophobic film support, and comprises a copolymer formed from 45 to 99.5 percent by weight of at least one of the chlorine-containing monomers vinylidene chloride and vinyl chloride, from 0.5 to 10 percent by weight of an ethylenically unsaturated hydrophilic monomer, and from 0 to 54.5 percent by weight of at least one other copolymerisable ethylenically unsaturated monomer, and a layer (B) comprising in a ratio of 1:5 to 1:0.5 by weight a mixture of gelatin and a copolymer of 30 to 70 percent by weight of butadiene with at least one copolymerisable ethylenically unsaturated monomer.

According to a preferred embodiment the photosensitive layer is prepared by dispersing (a) selected pigment(s) in the desired concentration in an aqueous gelatin solution. For colour proofing purposes the concentration is, e.g., such that on drying a recording layer having an optical density in the wavelength range of maximal absorption of at least 1 is obtained. The coating composition contains preferably at least 50 percent by weight of gelatin in respect of the pigment particles and a proper amount of plasticizing agent and repellent (a water-attracting compound, e.g., glycerol) in order to provide to the coating a sufficient adherence to its temporary support and to enable its easy wet (aqueous) stripping off from the temporary support, preferably an unsubbed cellulose triacetate support.

The photosensitive coating preferably contains 1 to 10 g of gelatin per sq.m. Optimal results are obtained with 3 g of gelatin per sq.m.

In order to improve the sharpness of the graphic reproduction the photosensitive colloid layer may contain a screening dye.

A second coating, the so-called top layer, the composition of which is preferably identical to the foregoing, except that no pigment(s) is (are) present, is coated on the first one. The second coating preferably contains 1 to 5 g of gelatin per sq.m. It is, however, not strictly necessary to incorporate a radiation-sensitive iron(III) complex into said second coating, since during coating and drying a sufficient amount of said compound can diffuse therein from the underlying pigmented layer.

The said second coating forms with the underlying pigmented coating one hardenable double layer firmly bound together, in other words a "composite layer" that can be transferred as a whole from the temporary support to the permanent support.

A set of materials containing such a composite layer is preferably used for preparing a multicolour "colour proofing image". A usual set contains yellow, magenta, cyan, and black pigment coatings on separate cellulose triacetate supports.

According to a preferred embodiment the preparation of a multicolour reproduction such as a "colour proof" proceeds as follows.

To said permanent support subbed as described above the unexposed pigment coating is transferred by pressing the surface of the subbing layer and of the unexposed coating together in the presence of an aqueous liquid and by peeling off the temporary cellulose triacetate support.

According to a preferred embodiment the permanent support is soaked for 1 min. at room temperature with a mixture of a water-miscible alkanol and water, e.g., a mixture of ethanol and water 70:30 percent by volume, before pressing it against the hardenable colloid layer on the temporary support.

The pressure step can be carried out in an apparatus in which the materials involved are pressed together between rollers.

A suitable apparatus for that purpose is described in the published Dutch patent application No. 6915595.

Said apparatus is particularly suitable for use in transferring colloid layers from a temporary support to a permanent support in wet or moist state. Such apparatus comprises a pair of co-operating pressure rollers and means for driving said rollers, a first platform for supporting the permanent support prior to its engagement by said pressure rollers, said platform being formed in such a way as to establish an interrupted or discontinuous contact with the permanent support when this is placed thereon, a second platform arranged over and separated from the first surface for supporting at least the leading part of the temporary support to keep said temporary support separated from a permanent support when this is located on this first platform, the forward ends of both said platforms being disposed proximate to the nip of the pressure rollers so that the supports as they are advanced are gripped by said rollers and progressively pressed together.

The information-wise exposure following the transfer is preferably a contact exposure carried out through a transparency, which can be a halftone or line-work transparency. In the present invention the exposure for producing multicolour reproductions is always an exposure in register which is easier to realize and yields multicolour relief prints of higher quality than in those techniques in which relief patterns have to be transferred in register to a same permanent support.

The exposure, preferably being a vacuum frame contact-exposure, is carried out with a light source sufficiently emitting in the ultra-violet range of the spectrum, e.g., with a carbon arc, a xenon arc, or a high pressure mercury vapour tube. The duration of the exposure does not only depend on the photosensitivity of the iron(III) complex but also on the type of the pigment, more particularly on its inherent absorption of ultraviolet radiation and blue light. In order to obtain a halftone relief print having an optimal dot sharpness the pigment coating is exposed while being in direct contact with the image-containing layer of the transparent original. Considerable dot gain is obtained when exposing the pigment coating in direct contact with the support of a silver image transparency used as an original.

For the purpose of positive colour proofing after the transfer and drying, e.g., with a hot air stream, the hardenable gelatin layer is exposed through a first positive halftone separation transparency of the original. In the case of preparing a colour proof of a four-colour print a cyan pigment coating is e.g. first applied to the permanent support and exposed through the cyan printer halftone separation positive of the original.

After exposure, hardening of the hydrophilic colloid layer proceeds by means of iron(III) ions set free from the unexposed photosensitive iron(III) complex. Setting free of iron(III) ions proceeds by means of one of the types of the already described activator liquids, e.g., an activator liquid in which the concentration of ammonium hydroxide and organic amines is between about 1 and 20 percent by weight.

After the treatment with the activator liquid, which may last from about 30 seconds to about 5 minutes according to the concentration and type of activator solution, the information-wise exposed portions of the hydrophilic colloid recording layer are washed away selectively with a jet of tap water, preferably at 30°–50°C.

It is, however, possible to apply a so-called cold water wash-off (using water of 15° to 30°C) by using in the photosensitive coating a lyotrope substance having an influence on the gelsol transformation of gelatin. The lyotropic substances are ions, radicals or chemical compounds that show a more or less pronounced hydration. Particularly suited lyotropic substances for the purpose of gel-sol transformation of gelatin are: lithium chloride and sodium salicylate.

In the activator liquid of the other type the concentration of metal salts may vary within wide limits. Thus, e.g., calcium chloride is already active at a concentration of 1 percent by weight. A higher concentration (between 5 and 10 percent by weight) of chloride ions improves the transition of the gel to the sol form of gelatin and facilitates the washing off of the exposed portions of the recording layer at room temperature.

The organic solvent in the activator liquid as explained already controls the swelling of the colloid layer and improves the mechanical strength of the hardened portions. A concentration exceeding 80 percent of ethanol is not desirable for it prevents the penetration of the calcium ions and decreases the iron(III) ion liberation. A concentration of 50 to 80 percent by weight of ethanol in the activator liquid is very appropriate. Preferably it is used in a concentration of 60 percent by weight.

In four colour print proofing the same steps of transfer, exposure, activation treatment and wash-off development are carried out for the yellow, magenta, and black-pigmented coating, which are exposed in register on the same support carrying already the cyan pigment coating but now respectively through the yellow printer halftone, magenta printer halftone and black printer halftone positive of the original. However, the order wherein the colour relief images are made may be chosen arbitrarily.

The obtained colloid pattern or multilayer colloid pattern can be protected and given a glossy appearance by a transparent resin top-coat, which according to a preferred embodiment is applied by spraying a resin solution. A suitable "spray-cover" consists of polyisobutyl methacrylate.

The invention is illustrated more in detail in the following examples.

The percentages are by weight if not otherwise indicated.

EXAMPLE 1

A coating composition was prepared containing the following ingredients:

| | |
|---|---|
| 10 % aqueous gelatin solution | 50 ml |
| HELIOGENBLAU B COLANYL TEIG (a cyan pigment dispersion marketed by Badische Anilin- & Soda-Fabrik A.G., Ludwingshafen/Rh. - W.Germany) | 1 g |
| 10 % aqueous solution of glycerol | 10 ml |
| 5 % aqueous solution of iron(III) potassium oxalate | 23 ml |
| TERGITOL 4 (trade name for 2-methyl-7-ethyl-4-undecanol ester of sodium hydrogen sulphate marketed by Union Carbide and Carbon, New York, N.Y., U.S.A.) | 0.7 ml |
| water | 10 ml |

Said composition was coated by air-knife at a temperature of 37°C in a ratio of 22 sq.m/litre on a cellulose triacetate film of 0.1 mm as the temporary support. The coating formed was gelled by cooling for 1 min. at 8°C.

To the gelled coating was applied a pigmentless top layer from the following composition:

| | |
|---|---|
| 10 % aqueous solution of gelatin | 30 ml |
| 10 % aqueous solution of glycerol | 6 ml |
| 5 % aqueous solution of iron(III) potassium oxalate | 14 ml |
| TERGITOL 4 (trade name) | 1.5 ml |
| water | 43 ml |

The said composition was coated by air-knife at a temperature of 27°C in a ratio of 30 sq.m/litre, gelled, and dried.

The U.V.-sensitive pigment material thus obtained had to be transferred to a permanent support consisting of an aluminium sheet both sides of which were laminated with a paper sheet of 90 g/sq.m, these paper sheets being covered in their turn with a formaldehyde-hardened gelatin coating of 5 g/sq.m.

The operation for obtaining a first coloured colloid image relief then proceeded as follows:

The permanent support of the pigment coating was soaked for 1 min. at room temperature with a mixture of ethanol and water (70:30 percent by volume) and thereupon pressed in wet state between soft rollers in contact with the described colloid layer on the temporary support. After a contact period of 30 sec. the temporary support was stripped off, thus leaving the cyan pigment coating fixed on the permanent support. The transferred coating was air-dried and put in a vacuum frame in contact with a cyan printer seperation halftone positive of the original to be reproduced by printing.

The pigment coating was exposed for 5 min. with a carbon arc light source (1 × 40 Amp.) placed at a distance of 40 cm.

The exposed pigment coating was dipped for 4 min. in an activator liquid having the following composition:

| | |
|---|---|
| 40 % aqueous calcium chloride solution | 125 ml |
| ethanol | 600 ml |
| water | 275 ml |

A relief image was obtained by washing without rubbing in running water of 35°C. Subsequently, the recording material was dipped for 1 min. in a mixture of ethanol and water (70:30 percent by volume) in order to deflate the relief portions and strengthen the image.

The recording material may also be dried by squeezing off the adhering liquid and drying the relief portions in a hot air current not surpassing 60°C.

In order to prepare a multicolour proof a yellow pigment coating was transferred (pressure contact 30 sec.) from an unsubbed cellulose triacetate temporary support to the cyan relief image that had been deflated with the alcohol/water treatment and kept wet. The yellow pigment coating had the same composition as the cyan pigment coating except that 4 g of Pigment Yellow 16 (C.I. 20,040) sold under the name PERMANENT GOLB NCG COLANYL TEIG by Farbwerke Hoechst AG, Frankfurt (M), Hochst, W.Germany) were substituted for 1 g of HELIOGEN BLAU B COLANYL TEIG.

The whole cycle of exposure and development was repeated, the exposure of the yellow pigment coating lasting now 10 minutes. The yellow printer separation halftone positive was exposed in register with the already obtained cyan relief image.

In the same way also a magenta printer halftone relief image was formed in superposition with the cyan and yellow image already present. The exposure in register of the magenta pigment coating lasted 5 min.

The composition of the transferable magenta pigment coating was the same as that of the cyan pigment coating, except that 1.2 g of PIGMENT RED 48 (C.I. 15,865) sold under the name LITHOLSCHARLACH BBM PIGMOSOL (a magenta pigment dispersion marketed by Badische Anilin- & Soda-Fabrik — Ludwigshafen/Rh. —W.Germany) was substituted for 1 g of HELIOGENBLAU B COLANYL TEIG.

A black-printer halftone relief image was formed on the magenta-printer halftone relief image in superposition therewith. The exposure in register of the black pigment coating lasted 10 min.

The composition of the transferable black pigment coating was the same as that of the cyan pigment coating, except that 1.3 g of carbon black (average particle size 0.1 μ) dispersion (solid content 20 percent) instead of the cyan pigment was used.

EXAMPLE 2

The transfer of the cyan pigment coating of Example 1 was repeated.

The exposure proceeded for 5 min. through a same cyan printer separation halftone positive as described in Example 1 by means of a xenon gas pulsation lamp (5,000 watt) placed at a distance of 40 cm.

The exposed material was dipped for 4 min. in an activator liquid of 18°C and being composed as follows:

| | |
|---|---|
| water | 100 ml |
| 50 % aqueous zinc chloride solution | 300 ml |
| ethanol | 600 ml |

The non-hardened portions of the recording layer were selectively washed off with a jet of water at room temperature (18°C).

The obtained relief image was deflated by dipping it for 1 min. in an ethanol/water (70:30 percent by volume) mixture. The surplus liquid was squeezed off and the recording material subsequently dried in an air stream of 50°C.

A cyan positive screen image of very good quality was obtained.

EXAMPLE 3

Part 1

A magenta coloured colloid composition sensitive to ultraviolet radiation was prepared by allowing to swell 63 g of gelatin in 494 ml of water and melting the gelatin at 50°–55°C, whereupon the following composition was added with stirring:

| | |
|---|---|
| a 5 % aqueous solution of ULTRAVON-W (a heptadecyl-benzimidazole disodium sulphonate dispersing agent marketed by CIBA A.G., Basel, Switzerland) | 16 ml |
| 10 % aqueous solution of glycerol | 126 ml |
| LITHOLSCHARLACH BBM PIGMOSOL (trade name) | 9 g |

The resulting mixture was then admixed with:

| | |
|---|---|
| water | 143 ml |
| 10 % aqueous solution of saponine | 10 ml |
| 5 % aqueous solution of the sodium salt of o-sulfobenzoic acid dodecafluoroheptyl ester | 6 ml |
| an aqueous 7.5 % solution of iron(III) ammonium oxalate | 168 ml |

The resulting composition was coated by air-knife at 35°C in a ratio of 23 sq.m/l to a temporary support of unsubbed cellulose triacetate having a thickness of 0.1 mm. The solution was gelled at 8°C.

To the gelled layer a protective layer was coated by air-knife. The coating composition of the protective layer was formed by allowing to swell 27 g of gelatin in 768 ml of water, adding a 10 percent dispersion of colloidal silica (average particle size: 2–3 μ) in an 8 percent aqueous solution of gelatin, melting at 45° to 48°C, and adding successively:

| | |
|---|---|
| 10 % aqueous solution of glycerol | 60 ml |
| 5 % aqueous solution of saponine | 20 ml |
| TERGITOL 4 (trade name) | 15 ml |
| 7.5 % aqueous solution of iron(III) ammonium oxalate | 80 ml |

The coating composition was applied at 24°C in a ratio of 30 sq.m/l whereupon the protective layer was gelled and dried.

The resulting light-sensitive layer was transferred as described furtheron to an opaque permanent support of biaxially stretched polyethylene terephthalate of 180 μ thickness, which was subbed at both sides with the following composition at 25°–30°C in a ratio of 1.6 g/sq.m:

| | |
|---|---|
| copolymer of vinylidene chloride, N-tert.-butylacrylamide, n-butyl acrylate, and N-vinylpyrrolidone (70:23:3:4) | 5.5 g |
| METHYLENE CHLORIDE | 65 ml |
| 1,2-dichloroethane | 35 ml |

The resulting layer was coated with a mixture prepared as follows:

1,350 g of titanium dioxide (average particle size: 0.11 $\mu$) were dispersed in 5 l of water containing 25 ml of DEQUEST 2006 (trade name of Monsanto Chemical Company, St.Louis, Mo., U.S.A., for a dispersing agent corresponding to the following structural formula:

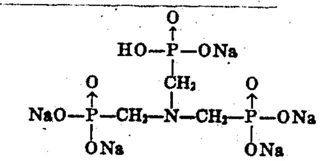

The dispersion was stirred rapidly for 10 min. at 5° to 15°C and then heated to 35°C, at which temperature 400 ml of a 10 percent aqueous solution of gelatin were added under continued rapid stirring. Subsequently the following composition was added by stirring slowly to avoid scumming:

| | |
|---|---|
| 10 % aqueous solution of gelatin | 1800 ml |
| water | 130 ml |
| 20 % latex of copolymer of butadiene and methyl methacrylate (50:50) | 2500 ml |
| 10 % aqueous solution of the sodium salt of oleylmethyltauride | 37.5 ml |
| ethylene chlorohydrin | 500 ml |

Coating was carried out in such a ratio that upon drying a layer of 5 $\mu$ was obtained.

The white permanent support was immersed for at least 90 sec. in an aqueous solution of an alcohol, e.g., ethanol, isopropanol or n-propanol. The proportion by volume between the alcohol and water may vary between 1:1 and 6:1, the proportion of 2:1, however, being preferred.

The wetted permanent support was pressed in contact with the light-sensitive layer (the pressure can be effected by means of a hand roller or two rollers driven by a motor). After the transfer the temporary support was stripped off.

The layer was dried in a hot air-stream having a temperature not exceeding 60°C.

The exposure was carried out in a vacuum contact frame through a magenta printer separation halftone positive of the multicolour original to be reproduced. Said halftone positive is a halftone (screen dot) silver image positive obtained by means of a silver halide emulsion layer suited for lith type development. During exposure the developed emulsion layer was kept in contact with the magenta coloured photo-sensitive colloid layer. The exposure proceeded by means of a xenon pulsation lamp (5,000 watt) placed at a distance of 40 cm, and lasted 5 min. If the material was held in adequate contact by the exposure frame it was not liable to overexposure. When the image-bearing layer is kept in close contact with the light-sensitive coating overexposure has little practical influence on the image quality.

After exposure the light-sensitive layer was dipped for 4 min. in an aqeuous activator liquid containing 15 percent by weight of zinc chloride and 60 percent by volume of ethanol.

The colloid relief pattern was developed by washing away the non-hardened (exposed) gelatin without rubbing in running water of 20°C.

After washing away the non-hardened gelatin and before the application thereto of a next colloid layer, the magenta relief pattern obtained was immersed for 90 sec. in an alcohol/water bath (66:34 percent by volume).

Part 2

The still wet magenta relief pattern obtained was coated with a U.V.-sensitive yellow layer prepared from the following composition:

| | |
|---|---|
| A. gelatin | 63 g |
| water | 374 ml |
| 5% aqueous solution of ULTRAVON W (trade name) | 15.5 ml |
| B. HANSA YELLOW G 30 COLANYL (C.I. 11,680) | 9 g |
| 10% aqueous solution of glycerol | 94.5 ml |

B was added to A with stirring. To the resulting mixture the following compounds were added:

| | |
|---|---|
| water | 59.5 ml |
| 10 % aqueous solution of saponine | 10 ml |
| 5 % aqueous solution of the sodium salt of the dodecafluoroheptyl ester of o-sulphobenzoic acid | 6 ml |
| 7.5 % aqueous solution of iron(III) ammonium oxalate | 336 ml |

The solution was coated by air-knife on a non-subbed cellulose triacetate support of 0.1 mm thickness at 35°C in a ratio of 23 g sq.m/l. The solution was gelled at 8°C. To the gelled layer a protective layer was coated by air-knife from a composition prepared as follows:

| | |
|---|---|
| gelatin | 27 g |
| water | 748 ml |
| 10 % dispersion of colloidal silica (average particle size 2–3 $\mu$) in a 8 % aqueous solution of gelatin | 30 g |

The mixture was allowed to melt whereupon the following compounds were added:

| | |
|---|---|
| 5 % aqueous solution of saponine | 20 ml |
| TERGITOL 4 (trade name) | 15 ml |
| 7.5 % aqueous solution of iron(III) ammonium oxalate | 160 ml |

The application of the protective layer was performed as described in Part 1. The transfer of the yellow layer to the already existing magenta printer relief image was carried out according to the same technique as described above for the magenta layer. A yellow printer separation halftone positive of the original to be reproduced was used in the exposure, which lasted now 10 min. and was carried out in register with the magenta printer pattern by using the same exposure source and distance as in Part 1. The activator liquid treatment, wash off treatment and deflation treatment were the same as in Part 1.

Part 3

On the still wet yellow relief pattern a light-sensitive cyan layer was transferred having the following composition:

| | |
|---|---|
| A. same composition as that given in Part 2. | |
| B. HELIOGENBLAU B COLANYL TEIG (trade name) | 5 g |
| 5% aqueous solution of ULTRAVON W (trade name) | 16 ml |
| 10% aqueous solution of glycerol | 126 ml |

To the mixture of A and B were added 69.5 ml of water. Subsequently the resulting composition was then admixed with:

| | |
|---|---|
| 5 % aqueous solution of TARTRAPHENINE 250 % (C.I. 19,140) marketed by Sandoz A.G., Basel, Switzerland | 12.5 ml |
| 5 % aqueous solution of the sodium salt of the dodecafluoro-heptyl ester of o-sulphobenzoic acid | 6 ml |
| aqueous 7.5 % solution of iron(III) ammonium oxalate | 168 ml |

The solution was coated at 35°C in a ratio of 23 sq.m-/l by air-knife on a non-subbed cellulose triacetate support having a thickness of 0.1 mm.

The coated solution was gelled at 8°C. To the gelled layer a protective layer was coated by air-knife from a composition prepared as follows:

| | |
|---|---|
| gelatin | 27 g |
| water | 748 ml |
| 10 % dispersion of colloidal silica (average particle size 2–3 μ) in an 8 % aqueous solution of gelatin | 30 g |

The mixture was allowed to melt, whereupon the following composition was added:

| | |
|---|---|
| 5 % aqueous solution of saponine | 20 ml |
| TERGITOL 4 (trade name) | 15 ml |
| aqueous 7.5 % by weight solution of ammonium iron(III) oxalate | 160 ml |

The transfer of the colloid layer composition proceeded as described in Part 1. A cyan printer separation halftone positive of the original to be reproduced was used in the exposure, which lasted now 5 min. and was carried out with the separation halftone positive in register with the underlying relief patterns and by using the same exposure source and distance as described in Part 1. The activator liquid treatment, wash-off treatment and deflation treatment were the same as in Part 1.

The result was a three colour proofing image having the same colours as if it were printed. The multicolour image offered a true reproduction of the separation positives, and contained very sharply reproduced dots, the size of which was a true reproduction of the dots present in the separation positives serving as originals in the exposures.

EXAMPLE 4

A cyan coloured photosensitive colloid layer was transferred and exposed as described in Example 1. The activating treatment proceeded now with an aqeuous 2.25 percent zinc sulphate solution. The non-hardened colloid portions were now washed-off with water of 35°–40°C.

After deflation of the remaining colloid portions by dipping them for 1 min. in an ethanol/water (70:30 by volume) mixture the adhering liquid was squeezed off and the relief image dried in an air stream of 50°C.

A positive cyan halftone image of good quality was obtained.

A selective wash-off with a jet of water at room temperature was realized after dipping the exposed colloid layer in an activator liquid of the following composition:

| | |
|---|---|
| 45 % aqueous zinc sulphate solution | 50 ml |
| acetonitrile | 120 ml |
| water | 250 ml |

On replacing in the activator liquid the acetonitrile by a same amount of dimethylformamide or dimethylsulphoxide the same results were obtained afer a dipping time of 5 min.

Instead of using an ethanol/water mixture for the deflation of the colloid portions the following composition was applied successfully:

| | |
|---|---|
| water | 700 ml |
| 50 % aqueous zinc chloride solution | 250 ml |
| 45 % aqueous zinc sulphate solution | 50 ml |

The dipping time was in the range of 2 to 8 min.

Zinc sulphate can be replaced by other salts that introduce sulphate ions in the colloid, e.g., sodium sulphate or ammonium sulphate.

EXAMPLE 5

A recording layer transferred and exposed as described in Example 1, and treated in the first activator bath described in Example 4 was dipped for 1 min. in an aqueous 10 percent solution of barium chloride. The non-hardened colloid portions were washed off with water at room temperature.

On replacing the barium chloride by same amounts of strontium chloride, lithium chloride or sodium salicylate the same results were obtained after a dipping time of 4 min.

EXAMPLE 6

The same cyan coloured recording material and processing as described in Example 1 were applied with the difference, however, that the activator liquid had the following composition:

| | |
|---|---|
| 10 % aqueous cadmium chloride solution | 500 ml |
| ethanol | 500 ml |

The dipping time was 4 min. The same results were obtained by replacing the cadmium chloride by a same amount of cadmium nitrate.

EXAMPLE 7

The same cyan coloured recording material and processing as described in Example 1 were applied with the difference, however, that the activator liquid had the following composition:

| | |
|---|---|
| 25 % aqueous ammonium hydroxide solution | 400 ml |
| ethanol | 600 ml |

The dipping time was 30 seconds.

The same results were obtained with developing baths A) and B) having the following composition respectively:

| | | |
|---|---|---|
| A) | water | 300 ml |
| | mono-ethanolamine | 100 ml |
| | ethanol | 600 ml |
| B) | 8 % aqueous sodium carbonate solution | 500 ml |
| | 20 % aqueous sodium sulphate solution | 50 ml |
| | water | 450 ml |

EXAMPLE 8

Part 1

A cyan non-light-sensitive hardenable colloid layer was prepared by allowing to swell 63 g of gelatin in 662 ml of water and melting the gelatin at 50°–55°C, whereupon the following composition was added with stirring:

| | |
|---|---|
| 5 % aqueous solution of ULTRAVON-W (trade name) | 15.5 ml |
| HELIOGENBLAU B COLANYL TEIG (trade name) | 5 g |
| 10 % aqueous solution of glycerol | 126 ml |

The resulting mixture was then admixed with:

| | |
|---|---|
| water | 73.5 ml |
| 5 % aqueous solution of TARTRAPHENINE 250 % (C.I. 19,140) marketed by Sandoz A.G., Basel, Switzerland | 12.5 ml |
| 10 % aqueous solution of saponine | 10 ml |
| 5 % aqueous solution of the sodium salt of the dodecafluoroheptyl ester of o-sulpho-benzoic acid | 6 ml |

The resulting composition was air-knife coated at a temperature of 35°C in a ratio of 23 sq.m/l to a temporary support of non-subbed cellulose triacetate of 0.1 mm thickness. The coated solution was gelled at 8°C.

As described in Example 3 the permanent support was soaked for 30 sec. with the following composition containing the photosensitive ingredient:

| | |
|---|---|
| 7.5 % aqueous solution of iron(III) ammonium oxalate | 100 ml |
| ethanol | 600 ml |
| water | 300 ml |

The resulting light-sensitive layer was transferred to an opaque permanent support as described in Example 3.

The cyan non-light-sensitive colloid layer was pressed against the moist permanent support and after 1 min. of contact stripped from its temporary cellulose triacetate support.

The permanent support carrying the transferred colloid layer was dried with an air stream of 50°C. The cyan colloid layer wherein the photosensitive iron (III) ammonium oxalate had been transferred on contact with the wet permanent support was exposed through a yellow filter separation halftone positive of the multicolour original to be reproduced.

The exposure source was a xenon gas pulsation lamp of 5,000 watt placed at a distance of 40 cm from the colloid layer, which was exposed for 5 min.

The exposed recording layer was dipped for 4 min. in an activator solution as described in Example 2.

The non-hardened colloid layer portions were washed off with a jet of water at room temperature.

The relief image portions were deflated in the liquid composition by means of which the permanent support was wetted before transfer thereon of the cyan colloid layer.

Part 2

The cyan relief pattern obtained was coated with a hardenable yellow colloid layer having the following composition:

| | | |
|---|---|---|
| A) | gelatin | 63 g |
| | water | 662 ml |
| | 5 % aqueous solution of ULTRAVON W (trade name) | 15.5 ml |
| B) | HANSA YELLOW G 30 COLANYL (C.I.11,680) | 9 g |
| | 10 % aqueous solution of glycerol | 126 ml |

B was added to A with stirring. To the resulting mixture the following compounds were added:

| | |
|---|---|
| water | 73.5 ml |
| 10 % aqueous solution of saponine | 10 ml |
| 5 % aqueous solution of the sodium salt of the dodecafluoroheptyl ester of o-sulphobenzoic acid | 6 ml |
| 5 % aqueous solution of TARTRAPHENINE 250 % (C.I.19,140) marketed by Sandoz A.G., Basel, Switzerland | 12.5 ml |

The coating and transfer of the yellow colloid layer proceeded as described in Part 1 for the blue layer.

The transferred yellow colloid layer was exposed in register with the underlaying relief patterns through a blue filter separation halftone positive of the multicolour original to be reproduced.

The exposure conditions were the same as described in Part 1 with the difference; however, that the exposure lasted now 10 min. The activation treatment, wash-off treatment and deflation treatment were the same as in Part 1.

Part 3

The superposed cyan and yellow relief patterns were coated with a hardenable magenta colloid layer prepared from the following composition:

| | | |
|---|---|---|
| A) | gelatin | 63 g |
| | water | 662 ml |
| | 5 % aqueous solution of ULTRAVON W (trade name) | 15.5 ml |
| B) | LITHOLSCHARLACH BBM PIGMOSOL (trade name) | 9 g |
| | 10 % aqueous solution of glycerol | 126 ml |

B was added to A with stirring. To the resulting mixture the following compounds were added:

| | |
|---|---|
| water | 73.5 ml |
| 10 % aqueous solution of saponine | 10 ml |
| 5 % aqueous solution of the sodium salt of the dodecafluoroheptyl ester of o-sulphobenzoic acid | 6 ml |
| 5 % aqueous solution of TARTRAPHENINE 250 % (C.I.19,140) marketed by Sandoz A.G., Basel, Switzerland | 12.5 ml |

The coating and transfer of the magenta colloid layer proceeded as described in Part 1 for the cyan layer.

The transferred magenta colloid layer was exposed in register with the underlaying relief patterns through a green filter separation halftone positive of the multicolour original to be reproduced.

The exposure conditions were the same as described in Part 1.

The activation treatment, wash-off treatment and deflation treatment were also the same as in Part 1.

Part 4

The superposed cyan, yellow and magenta relief patterns were coated by transfer with a hardenable black colloid layer prepared from the following composition:

| | |
|---|---|
| A) gelatin | 63 g |
| water | 414 ml |
| 5 % aqueous solution of ULTRAVON W (trade name) | 15.5 ml |
| carbon black dispersion P 130 (marketed by Degussa, Frankfurt(M), W. Germany) | 10.5 g |
| 10 % aqueous glycerol solution | 126 ml |

A and B were mixed with stirring and to the obtained mixture were further added:

| | |
|---|---|
| water | 323 ml |
| 10 % aqueous solution of saponine | 12.5 ml |
| 5 % aqueous solution of the sodium salt of the dodecafluoroheptyl ester of o-sulphobenzoic acid | 6 ml |

The resulting composition was air-knife coated at 35°C in a ratio of 23 sq.m/l to a temporary support of non-subbed cellulose triacetate of 0.1 mm thickness. The coated solution was gelled at 8°C.

The transferred black colloid layer was exposed in register as described in Part 1 but through the black printer halftone positive corresponding therewith.

The exposed recording layer was dipped for 5 min. in an activator solution as described in Example 1, and the unhardened colloid portions were washed off with water at room temperature.

After deflation of the remaining relief pattern in an ethanol/water mixture (70:30 by volume) the adhering liquid was squeezed off and the relief pattern dried in an air stream of 50°C.

A four colour print with truly reproduced screen dots as present in the separation positives was obtained. The colour print served as a colour proof of a multicolour print to be made starting from said separation positives.

We claim:

1. A process for producing a multi-color half-tone color printing proof formed as a composite of plural relief images built up from a plurality of differently colored gelatin layers, which comprises the steps of:

1. transferring in entirety from a relatively hydrophobic temporary support to a permanent support, a colored hydrophilic hardenable gelatin layer containing a photosensitive compound consisting essentially of an iron(III) complex, by pressing said gelatin layer against said permanent support in the presence of an aqueous liquid and stripping away the temporary support,
2. imagewise exposing the transferred gelatin layer in substantially dry state to electromagnetic radiation adapted to reduce the iron(III) ions in the exposed regions of said layer to iron(II) ions,
3. treating the exposed layer with an activating liquid releasing free iron(III) ions from the iron(III) complex in the unexposed regions of the layer, and
4. developing the exposed and treated layer by washing off the unhardened exposed regions of said layer, leaving a relief pattern of hardened gelatin in the non-exposed regions thereof, and, using the same permanent support, repeating said steps (1)–(4) with at least one differently colored hydrophilic hardenable gelatin layer containing said photosensitive compound.

2. A process according to claim 1 wherein each said exposure is made with ultraviolet light modulated by a separation halftone positive transparency of a multicolor original in contact with said gelatin layer, the color of said separation transparency corresponding to the color of the gelatin layer.

3. A process according to claim 1, wherein the exposed gelatin layer is treated with an aqueous activating liquid having a pH above 8.

4. A process according to claim 3, wherein said activating liquid contains an alkaline compound selected from the group comprising an alkali metal carbonate, ammonium hydroxide or a water-soluble organic base.

5. A process according to claim 4, wherein the organic base is an aliphatic, alicyclic or heterocyclic water-soluble amine.

6. A process according to claim 5, wherein the amine is ethanolamine, diethanolamine, triethanolamine, cyclohexylamine, dicyclohexylamine, dimethylenetriamine, urotropine or morpholine.

7. A process according to claim 1, wherein the exposed gelatin layer is treated with an aqueous activating liquid containing a metal salt of a weak metal hydroxide and a relatively strong acid, which metal salt yields an aqueous solution with a pH lower than 7.

8. A process according to claim 7, wherein the anion of the salt is derived from an acid yielding in a concentration of 0.1 equivalent per liter a pH of 1.

9. A process according to claim 8, wherein the cation of the metal salt is a non-transition metal ion of a metal yielding weak basic hydroxides.

10. A process according to claim 9, wherein the cation of the metal salt is derived from a bivalent metal forming with oxalate ions a poorly water-soluble metal oxalate.

11. A process according to claim 1, wherein the coloured relief pattern is developed by means of a water jet of 30°–35°C.

12. A process according to claim 1, wherein each gelatin layer contains a lyotropic substance, increasing hydration, and the development is effected by washing with cold water.

13. A process according to claim 12, wherein each gelatin layer contains as said lyotropic substance, lithium chloride or sodium salicylate.

14. A process according to claim 3, wherein the activating liquid contains ammonium hydroxide and/or an organic amine in a concentration between 1 and 20 percent by weight.

15. A process according to claim 7, wherein the activating liquid contains said metal salts in a concentration between 5 and 10 percent by weight.

16. A process according to claim 3, wherein the activating liquid contains an organic water-miscible solvent, which controls the swelling of the gelatin layer.

17. A process according to claim 1, wherein the activating liquid contains an electrolyte effective as a precipitating agent for gelatin.

18. A process according to claim 1, wherein each colored gelatin layer on its temporary support is overcoated with an uncolored gelatin top layer.

19. A process according to claim 1, wherein each such coloured gelatin layer has a thickness in the range of 1 $\mu$ to 15 $\mu$.

20. A process according to claim 1, wherein each coloured gelatin layer contains a dye that is resistant to diffusion.

21. A process according to claim 1 wherein the photosensitive iron(III) complex consists of iron(III) ions complexed with ligands having an electron-donating character relative to the iron(III) ions.

22. A process according to claim 21 wherein the photosensitive iron(III) complex has the formula $(Fe^{III}A_n^{z})^{x}$ in which A represents a polybasic organic acid molecule, $n$ is the number of acid molecules, $z$ is the valency of the organic acid, and $x$ is the valency of the resulting complex ion.

23. The process of claim 1, wherein said steps 1–4 are carried out with each of a cyan-colored gelatin layer, a yellow-colored gelatin layer, a magenta-colored gelatin layer, and a black-colored gelatin layer, each such layer being exposed through a correspondingly colored halftone separation positive transparency of the multi-colored original to be duplicated.

24. A process according to claim 22, wherein the photosensitive iron(III) complex is an iron(III) oxalate complex.

25. A process according to claim 24, wherein the iron(III) complex is used in an amount of 10 to 25 percent by weight of the gelatin.

26. A process according to claim 1, wherein the photosensitive compound is introduced into the gelatin layer by imbibition.

* * * * *

UNITED STATES PATENT OFFICE

CERTIFICATE OF CORRECTION

Patent No. 3,793,026 Dated February 19, 1974

Inventor(s) Albert August Reyniers et al

It is certified that error appears in the above-identified patent and that said Letters Patent are hereby corrected as shown below:

In the Heading of the Patent, under [73] Assignee:

change "Geavaert-Agfa N.V." to -- Agfa-Gevaert --.

Signed and sealed this 3rd day of September 1974.

(SEAL)
Attest:

McCOY M. GIBSON, JR.
Attesting Officer

C. MARSHALL DANN
Commissioner of Patents

FORM PO-1050 (10-69)

USCOMM-DC 60376-P69
★ U.S. GOVERNMENT PRINTING OFFICE : 1969 O—366-334